(12) United States Patent
Zhuang et al.

(10) Patent No.: US 11,755,671 B2
(45) Date of Patent: *Sep. 12, 2023

(54) PROJECTING QUERIES INTO A CONTENT ITEM EMBEDDING SPACE

(71) Applicant: Pinterest, Inc., San Francisco, CA (US)

(72) Inventors: Jinfeng Zhuang, Seattle, WA (US); Yunsong Guo, Santa Clara, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,148

(22) Filed: Feb. 4, 2022

(65) Prior Publication Data

US 2022/0156336 A1 May 19, 2022

Related U.S. Application Data

(63) Continuation of application No. 15/930,771, filed on May 13, 2020, now Pat. No. 11,244,015.

(51) Int. Cl.
*G06F 16/9535* (2019.01)
*G06F 16/35* (2019.01)

(52) U.S. Cl.
CPC ........ *G06F 16/9535* (2019.01); *G06F 16/355* (2019.01)

(58) Field of Classification Search
CPC ............. G06F 16/9535; G06F 16/9536; G06F 16/9538; G06F 16/951
See application file for complete search history.

(56) References Cited

U.S. PATENT DOCUMENTS

| | | | |
|---|---|---|---|
| 8,019,748 B1 * | 9/2011 | Wu | G06F 16/3347 707/713 |
| 2017/0061294 A1 | 3/2017 | Weston et al. | |
| 2019/0197131 A1 * | 6/2019 | Shagraev | G06F 16/24578 |
| 2020/0311115 A1 * | 10/2020 | Tomberg | G16H 50/70 |

* cited by examiner

*Primary Examiner* — Kris E Mackes
(74) *Attorney, Agent, or Firm* — Athorus, PLLC

(57) ABSTRACT

Systems and methods for recommending content to an online service user are presented. In response to a request from a user, a set of n-grams of the request are generated, with each n-gram comprising one or more terms from the request and each n-gram of the set of n-grams being unique. Embedding vectors projecting the n-grams into a content item embedding space are generated, and the embedding vectors are combined into a representative embedding vector for the request. The nearest content items are identified according to a distance measure between a projection of the representative embedding vector and embedding vectors of content items of a corpus of content items in the content item embedding space. At least some of the nearest content items are returned as recommended content in response to the request from the user.

20 Claims, 10 Drawing Sheets

PROJECTING QUERIES INTO A CONTENT ITEM EMBEDDING SPACE

CROSS-REFERENCE TO PRIOR APPLICATIONS

This application is a continuation of and claims benefit to U.S. patent application Ser. No. 15/930,771, filed on May 13, 2020 and entitled "Projecting Queries Into A Content Item Embedding Space," which is hereby incorporated herein in its entirety.

BACKGROUND

Recommender systems are online services that recommend content to a computer user (or, more simply, a "user") in response to a query. Unlike search engines that respond to a query with a focused set of results that are viewed as "answers" to a query, recommender systems, are not necessarily tasked with responding with content that is specifically relating to the query. Instead, recommender services respond to queries with recommended content, i.e., content calculated to lead the requesting user to discovering new content. Roughly, search engines provide a focused scope to a specific topic while recommender services provide a broadened scope.

There are recommender services whose primary focus is to maintain visual content for its users/subscribers, enabling an environment of visual discovery. To manage and understand the visual content items, as well as determine what content items are related and/or similar, a recommender service (also called a discovery service) may use embedding vectors for each of the content items that it maintains. Generally, embedding vectors are the expressions of an embedding vector generator regarding a corpus of content items, the expression of how the embedding vector generator understands or views the content items and how they relate to each other. Embedding vectors allow the corresponding content items to be projected into a multi-dimensional embedding vector space, and that the similarity of two content items is a function of the distance between the projection of the two content items in the embedding vector space.

As those skilled in the art will appreciate, an embedding vector generator accepts a specific content type (or specific aggregation of content types) as input, analyzes the input content, and generates an embedding vector for that input content that projects the input content into the embedding vector space. Thus, if an embedding vector generator is trained to accept an image as the input type, the embedding vector generator analyzes an input image and generates a corresponding embedding vector for the image. However, providing text as input to that embedding vector generator, which is expecting an image as the input content, will result in a meaningless embedding vector being generated for the text content.

Since users typically communicate with services via text, current recommender services that maintain a corpus of non-text content items must perform an indirect mapping of a text-based query to a related, but broadened scope of content items when responding to the query.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
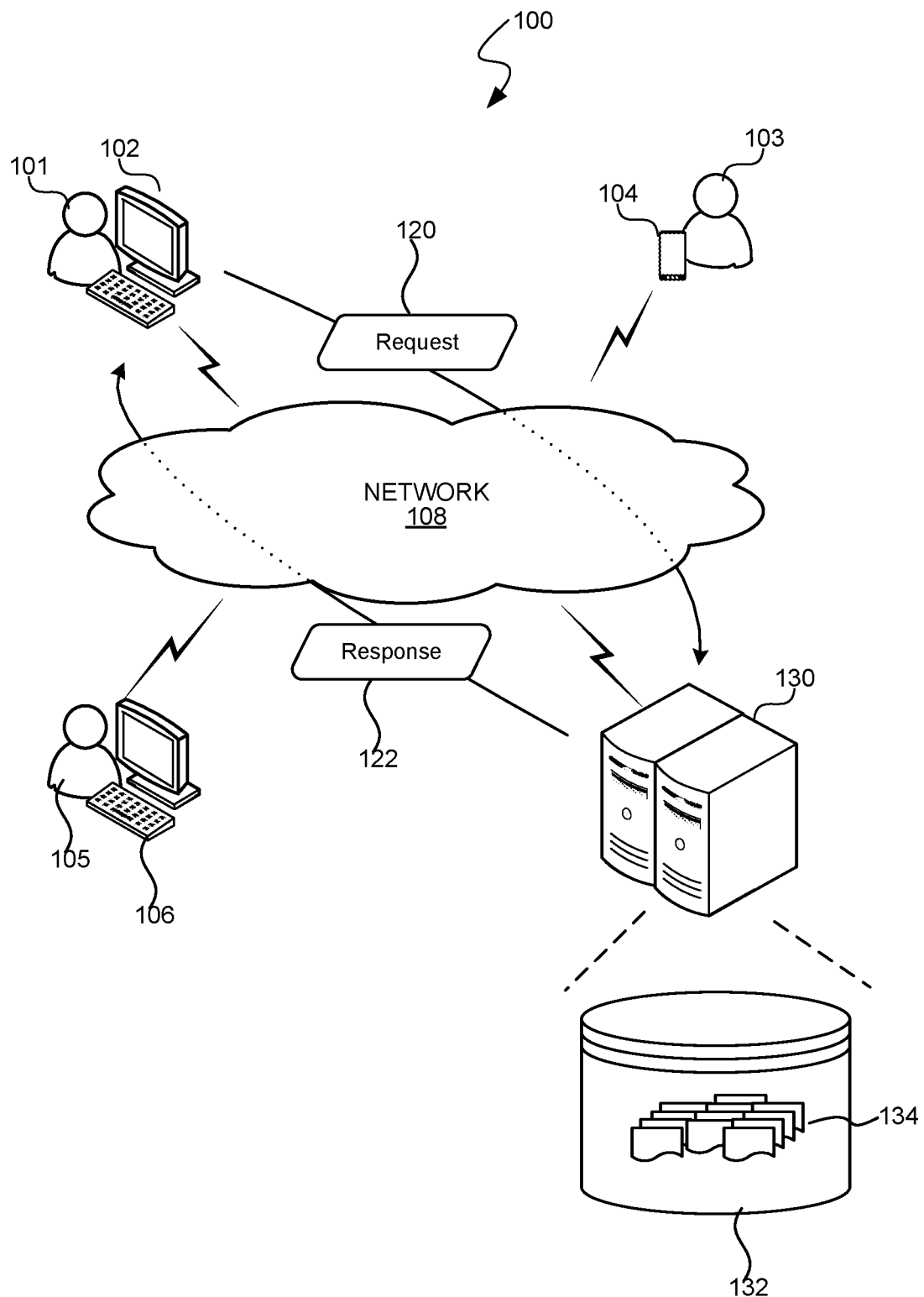
FIG. 1 is a block diagram illustrating an exemplary networked environment suitable for implementing aspects of the disclosed subject matter.

In accordance with various aspects and embodiments of the disclosed subject matter, systems and methods for recommending content to an online service's user are presented. In response to a request from a user, a set of n-grams of the request are generated, with each n-gram comprising one or more terms from the request and each n-gram of the set of n-grams being unique. Embedding vectors that project source content (in this case n-grams) into a content item embedding space are generated for each n-gram of the set of n-grams, and the embedding vectors are combined into a representative embedding vector for the request. The nearest content items are identified according to a distance measure between a projection of the representative embedding vector and embedding vectors of content items of a corpus of content items in the content item embedding space. At least some of the nearest content items are returned as recommended content in response to the request from the user.

In accordance with additional aspects and embodiments of the disclosed subject matter, a computer-executed method is set forth for providing content item recommendations to a user of the recommender service. A corpus of content items is maintained by the recommender service. In maintaining this corpus of content items, each content item is associated with metadata, and each content item is also further associated with an embedding vector that projects the associated content item into a content item embedding space. A request for recommended content items from the corpus of content items is received from a user of the recommender service and, in response, textual content of the received request is identified, where the identified textual content comprises a plurality of text terms. With the textual content identified, a set of n-grams is generated from that textual content, where each n-gram comprises one or more text terms of the plurality of text terms of the textual content. For each n-gram of the set of n-grams, an embedding vector for a current n-gram into the content item embedding space is generated. The embedding vectors of the n-grams of the set of n-grams are then combined into a representative embedding vector for the received request. A set of recommended content items from the corpus of content items is determined. More particularly, the recommended content items, when projected into the content item embedding space, are closest to the projection of the representative embedding vector in the content item embedding space. At least one content item from the set of recommended content items is selected and the at least one content item is returned as a response to the request for content items.

In accordance with additional aspects and embodiments of the disclosed subject matter and computer-executable instructions, embodied on computer-readable media, a method of a recommender service is presented that provides content item recommendations to a user of the recommender service in response to a request. A corpus of content items is maintained by the recommender service. In maintaining this corpus of content items, each content item is associated with metadata, and each content item is also further associated with an embedding vector that projects the associated content item into a content item embedding space. A request for recommended content items from the corpus of content items is received from a user of the recommender service and, in response, textual content of the received request is identified, where the identified textual content comprises a plurality of text terms. With the textual content identified, a set of n-grams is generated from that textual content, where each n-gram comprises one or more text terms of the plurality of text terms of the textual content. For each n-gram of the set of n-grams, an embedding vector for a current n-gram into the content item embedding space is generated. The embedding vectors of the n-grams of the set of n-grams are then combined into a representative embedding vector for the received request. A set of recommended content items from the corpus of content items is determined. More particularly, the recommended content items, when projected into the content item embedding space, are closest to the projection of the representative embedding vector in the content item embedding space. At least one content item from the set of recommended content items is selected and the at least one content item is returned as a response to the request for content items.

According to additional aspects of the disclosed subject matter, a computer system that provides content item recommendations in response to a query is presented. In execution, the computer system is configured to, at least, maintain a corpus of content items, where each content item is associated with metadata. Further, each content item is also associated with an embedding vector that projects the associated content item into a content item embedding space. In response to receiving a request for recommended content items from the corpus of content items from a user of the recommender service, the computer system is further configured to identify textual content of the received request, where the identified textual content includes a plurality of text terms. A set of n-grams is then generated from the textual content of the received request. Each generated n-gram comprises one or more text terms of the plurality of text terms. For each n-gram of the set of n-grams, an embedding vector is generated for a current n-gram into the content item embedding space using an embedding vector generator trained to generate an embedding vector for text-based content into the content item embedding space. The embedding vectors of the n-grams of the set of n-grams are combined into a representative embedding vector. A set of recommended content items is determined, the set comprising content items of the corpus of content items that, when projected into the content item embedding space, are closest to a projection of the representative embedding vector in the content item embedding space. At least one content item from the set of recommended content items is then selected and returned as a response to the request for content items.

By way of definition and as those skilled in the art will appreciate, an "embedding vector" is an array of values that reflect aspects and features of source/input content. For example, an embedding vector of an image will include an array of values describing aspects and features of that image. A process, referred to as an embedding vector generator, that generates an embedding vector for input content uses the same learned features to identify and extract information, the results of which leads to the generation of the embedding vector. Embedding vectors generated by the same process on the same source content type are comparable such that a greater the similarity between the embedding vectors of two source items (e.g., content items) indicates a greater similarity between the source items. By way of illustration and not limitation, an embedding vector may comprise 128 elements, each element represented by a 32- or 64-bit floating point value, each value representative of some aspect (or multiple aspects) of the input content. In other embodiments, the embedding vector may have additional or fewer elements and each element may have additional or fewer floating-point values, integer values, and/or binary values.

Regarding embedding vector generators, typically an embedding vector generator accepts input content (e.g., an image, video, or multi-item content), processes the input content through various levels of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively, the elements of an embedding vector can be used to project or map the corresponding input content into an embedding space as defined by the embedding vectors.

As indicated above, two embedding vectors (generated from the same content type by the same embedding vector generator) may be compared for similarity as projected within the corresponding embedding space. The closer that two embedding vectors are located within the embedding space, the more similar the input content from which the embedding vectors were generated.

Recommender services, or online services that provide recommender services, have access to or, commonly, maintain a corpus of content items. According to embodiments of the disclosed subject matter, a recommender service, such as recommender service 130, may be configured to host user posts of content items in its corpus of content items. Typically, though not exclusively, a user will post a content item to a virtual location—called a "page" within a virtual space associated with the user. Within that user's virtual space, the user may establish multiple pages, including a homepage which is a type of landing spot in the user's virtual space. According to various embodiments of the disclosed subject matter, a user may allow others to access content items on the user's pages and/or allow access to the user's pages within the user's virtual space. This "access" may include, by way of illustration and not limitation, viewing the pages and/or content items, making comments regarding the pages and/or content items, adding content items to the pages, copying content items from a user's page, and the like. According to aspects of the disclosed subject matter, it is these content items that are posted in users' virtual spaces that a recommender service uses and maintains as its corpus of content items.

In response to a request for recommended content from a user, the recommender service, such as recommender service 130, draws from the corpus of content items, identifying content items that satisfy or are similar to the user's request, and returns one or more of the identified content items to the user in response to the request. While there may be various ways for a recommender service to identify content items that satisfy a user's request, according to aspects of the disclosed subject matter, a suitably configured recommender service generates an embedding vector for the user's search query which projects the embedding vector into a content item embedding space. This embedding vector for the search query is referred to as a representative embedding vector. With the representative embedding vector, the recommender service identifies a set of nearest neighbors/content items within the content item embedding space as the most relevant or related content items, e.g., those content items that satisfy or are nearly-related to the user' query. From this set of nearest neighbors, the recommender service returns at least one or more of these neighbors/content items as recommended content item(s) in response to the user's request.

In identifying a representative embedding vector's nearest neighbors, the recommender service utilizes embedding vectors associated with the content items of the corpus of content items. While an embedding vector could be generated for a content item in a just-in-time manner, the computational requirements would be prohibitive. Instead, according to various embodiments of the disclosed subject matter, embedding vectors for the content items of the corpus are generated asynchronously and prior to receiving a user's request for recommended content items. In this regard, maintaining a corpus of content items includes associating an embedding vector with the content items of the corpus.

To further illustrate various aspects of the disclosed subject matter, reference is now made to the figures. In reference to FIG. 1, FIG. 1 is a block diagram illustrating an exemplary networked environment 100 suitable for implementing aspects of the disclosed subject matter, particularly regarding responding to a user's request with recommended/relevant content items. The networked environment 100 includes computer users 101, 103 and 105 connected, via computers and/or computing devices such as computing devices 102, 104 and 106, to a network 108. For purposes of disclosure, computer users 101, 103 and 105 may each be a user or subscriber of a recommender service, such as recommender service 130.

The network 108 is a computer network, also commonly referred to as a data network. As those skilled in the art will appreciate, the computer network 108 is fundamentally a telecommunication network over which computers, computing devices such as computing devices 102, 104 and 106, and other network-enabled devices and/or services can electronically communicate, including exchanging information and data. In computer networks, networked computing devices are viewed as nodes of the network. Thus, in the exemplary networked environment 100, computing devices 102, 104 and 106, as well as the recommender service 130, are nodes of the network 108.

In communicating with other devices and/or services over the network 108, connections between other devices and/or services are conducted using either cable media (e.g., physical connections that may include electrical and/or optical communication lines), wireless media (e.g., wireless connections such as 802.11x, Bluetooth, and/or infrared connections), or some combination of both. While a well-known computer network is the Internet, the disclosed subject matter is not limited to the Internet. Indeed, elements of the disclosed subject matter may be suitably and satisfactorily implemented on wide area networks, local area networks, enterprise networks, and the like.

In addition to the features of a recommender service described above, and by way of additional definition, the recommender service 130 is a network-accessible service that typically provides various services, application programming interfaces (APIs), processes and functions to its users/subscribers, including a facility for providing recommended content to a user in response to a request.

As shown in FIG. 1, the recommender service 130 includes a data store 132 storing a corpus of content items 134. Of course, this particular arrangement is a logical configuration, not necessarily an actual configuration. Indeed, there may be multiple data stores that collectively store the corpus of content items. Additionally and/or alternatively, the corpus of content items may be hosted on one or more computing devices accessible to the recommender service 130 via the network 108. Accordingly, the illustrated networked environment's 100 arrangement of computers and computing devices including computers and computing devices 102, 104 and 106, recommender service 130, and data store 132 storing the corpus of content items should be viewed as illustrative and not limiting.

In accordance with aspects of the disclosed subject matter, a computer user (or more simply, "user"), such as computer user 101, being a user or subscriber of the recommender service 130, submits a text-based request 120 to the recommender service. Utilizing techniques and processes described below, the recommender service 130 identifies one or more related content items (related to the text-based query from the user) and returns as least some content items as a response 122, comprising recommended content items, to the requesting computer user.

While there may be various services that carry out a text (query) to text (response) matching, the disclosed subject matter is not limited to this particular "matching." Indeed, the disclosed subject matter is advantageously applied to matching a text query to non-text items. According to aspects of the disclosed subject matter, the content items of the corpus of content items are non-text content items. By way of illustration and not limitation, the content items of the corpus of content items may comprise images, video content, audio content, executable content, non-textual data items, and the like.

It should be appreciated that providing recommended content in response to a user's request is distinct from responding to a query with "answers." Indeed, a query to a recommender service, such as recommender service 130, is an open-ended request that may or may not have a specific answer or response. Thus, identifying nearest neighbors to an embedding vector of the query represents the open-ended paradigm: recommending content that is "near to" the query, not necessarily the answer to the query.

Figure 2:
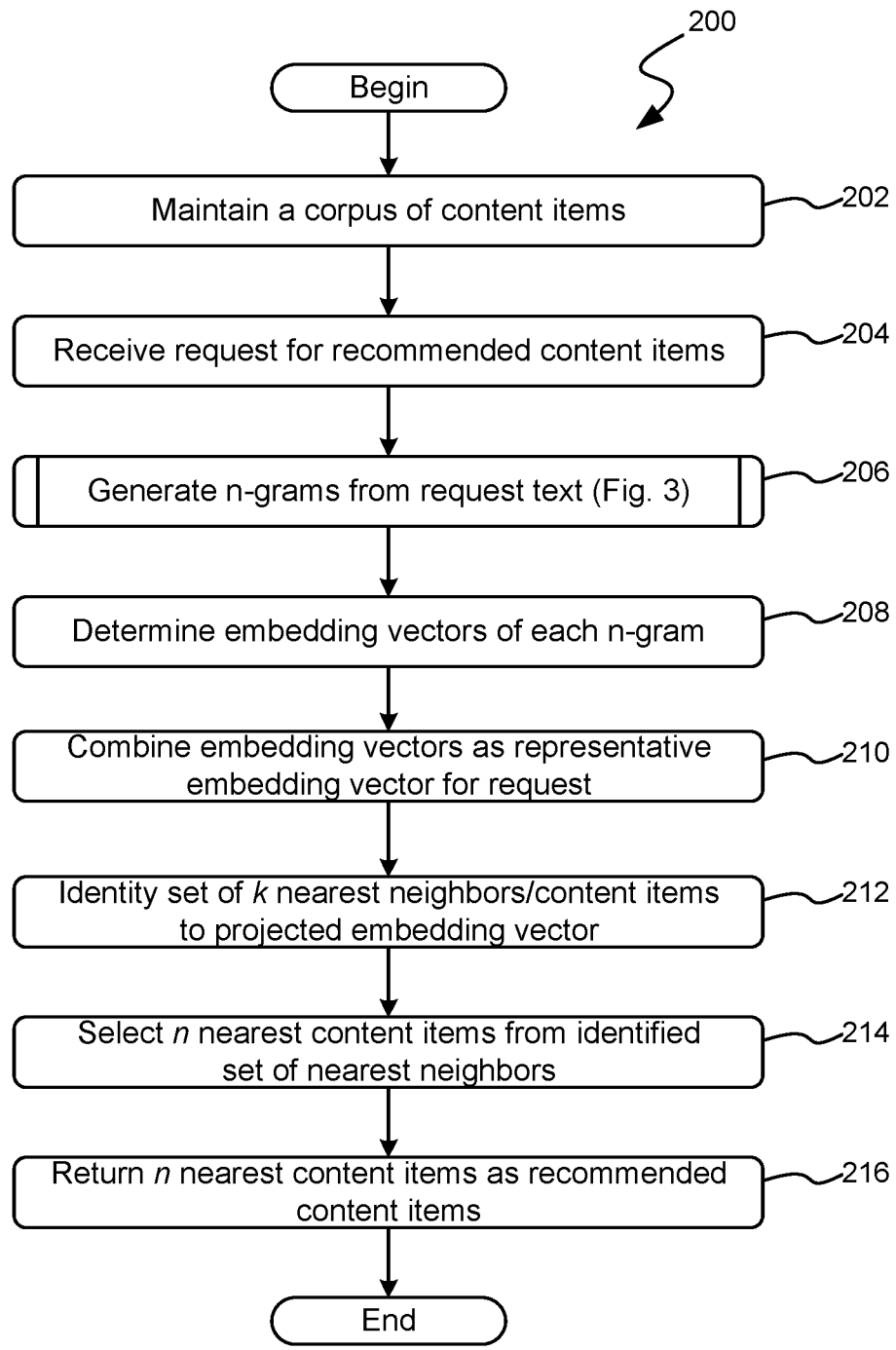
FIG. 2 is a flow diagram illustrating an exemplary routine for returning one or more recommended content items to a user in response to a query, in accordance with aspects of the disclosed subject matter.

To further illustrate the process of responding to a query with recommended content, reference is now made to FIG. 2. FIG. 2 is a flow diagram illustrating an exemplary routine 200 for returning one or more recommended content items to a user in response to a query, in accordance with aspects of the disclosed subject matter. Beginning at block 202, a recommender service, such as recommender service 130, maintains a corpus of content items the service can draw from in response to a user's query.

According to aspects of the disclosed subject matter, maintenance of the content items includes maintaining associated metadata with each of the content items. As per its definition, metadata associated with a content item comprises a set of data that describes and gives information about the content item. According to aspects of the disclosed subject matter, metadata associated with a content item may include, but is not limited to, various textual elements. These textual elements include, by way of illustration and not limitation, a file name of the content item, a uniform resource locator (URL) from which the content item was obtained, a title associated by a user that posted the content, a page title in which the content item is posted, page comments of the page in which the content item is posted, and the like.

According to additional aspects of the disclosed subject matter, in addition to maintaining metadata associated with content items of the corpus of content items 134, the recommender service 130 will typically maintain a content item embedding vector associated with each of the content items, where a content item embedding vector can be used to project the associated content item into a content item embedding space.

At block 204, the recommender service 130 receives a request from a user for recommended content. As shown in FIG. 1, this request may be generated by a user and submitted to the recommender service over a network 108. Of course, in this particular embodiment, the request is typically a text-based request for content. By way of illustration, a text-based request from a user may be, "Corvette R8," to view revision 8 Corvettes. While a text-based request/query is one example of a query, according to aspects of the disclosed subject matter there are other conditions in which a query is generated. A first example is when a user logs into the recommender service and is placed in the user's homepage. In this condition, it is often advantageous to obtain one or more recommended content items to present to the user in addition to the content items already within the user's homepage. The additional, recommended content items are identified for the user and presented in response to a request being triggered by the user logging into (or accessing) the user's homepage, or another page. A second example of a request being generated is when a user examines and/or interacts with a particular content item. In this condition, it is often advantageous to obtain one or more recommended content items relevant to the content item being viewed/interacted with, and a request is triggered by the viewing or interaction with that content item.

After having received the request for recommended content, the routine 200 proceeds to block 206, where a set of n-grams are generated from the "request text." According to aspects of the disclosed subject matter, and by way of definition, each n-gram of text content is a permutation of the terms within the textual content, each n-gram including one or more terms of the textual content. Generating these n-grams is set forth in greater detail below regarding routine 300 of FIG. 3.

Figure 3:
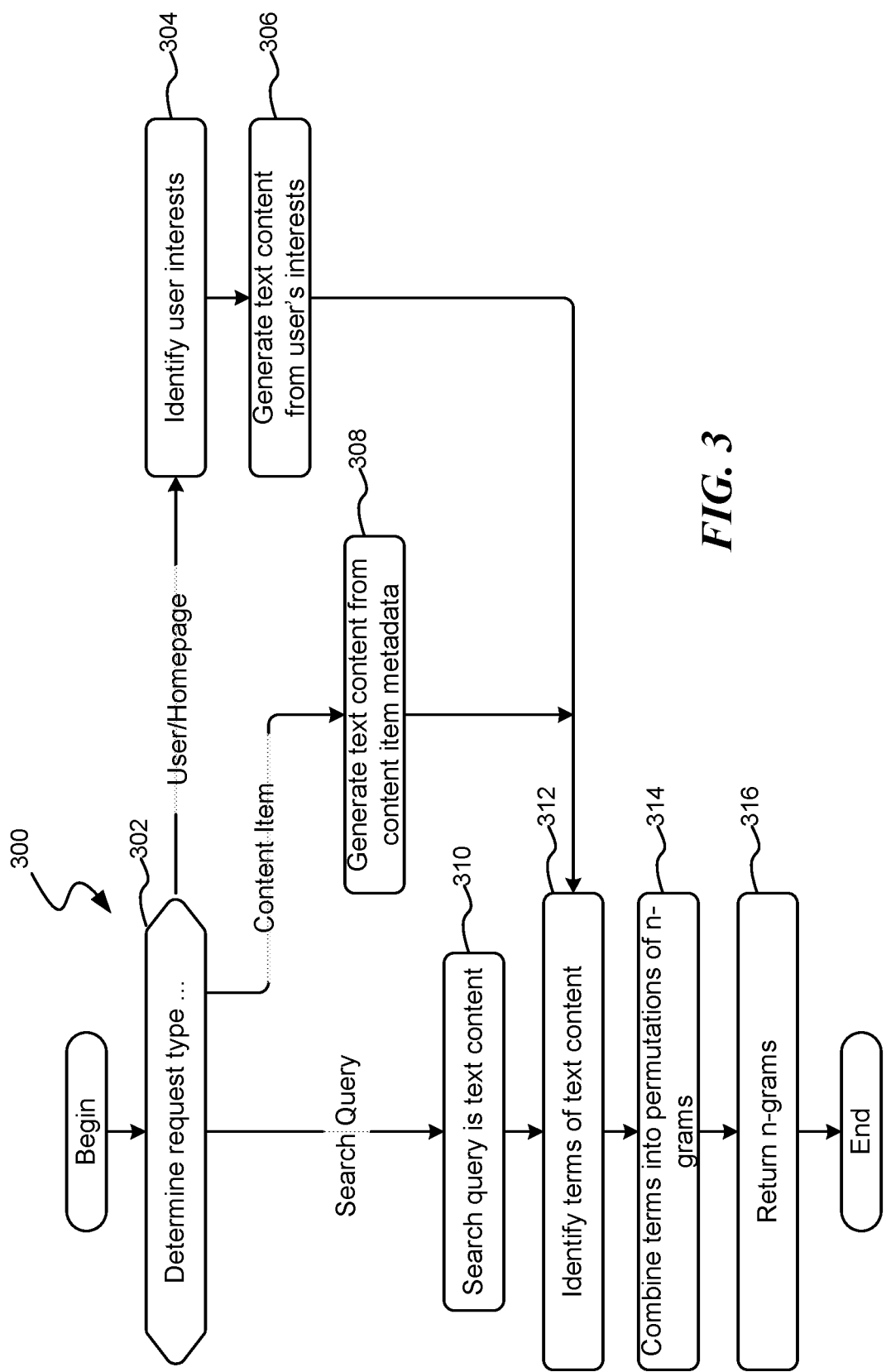
FIG. 3 is a flow diagram illustrating an exemplary routine for generating a set of n-grams from text content, in accordance with aspects of the disclosed subject matter.

Turning to FIG. 3, FIG. 3 is a flow diagram illustrating an exemplary routine 300 suitable for generating a set of n-grams from text content, in accordance with aspects of the disclosed subject matter. As there may be various conditions upon which a request is received, beginning at decision block 302 a determination is made as to the type of request that has been received. If the request is a "homepage request type", meaning that the request was triggered by the user accessing their homepage, the routine 300 proceeds to block 304.

At block 304, a set of interests of the requesting user are identified. These interests may be identified or otherwise determined by accessing a user profile associated with the user that includes explicit and implicit interests of the user. Additionally, evaluations of the user's homepage and other pages may be conducted (either synchronously to the request or asynchronously) to determine various interests of the user.

At block 306, the textual representations of these interests are aggregated as the text content of the request. By way of illustration and example, and not limitation, assuming that a user's interests correspond to "exotic sports cars," "home gardening," and "astrology," the text content for this homepage request type would be generated as the three distinct phrases: "exotic sports cars," "home gardening," and "astrology."

Regarding the use of the user's set of interests, it should be appreciated that a given user's interests may vary widely. The example above illustrates a wide variance between interests of the same person. Due to the potential that a user may have widely diverse interests, and according to aspects of the disclosed subject matter, each interest may be treated separately when generating n-grams. In this regard, n-grams can be generated from the text terms of a given interest but cannot be generated from the text terms of two or more interests. Indeed, it would make no sense to generate an n-gram of {gardening, astrology} from two of the user interests described above, but an n-gram of {exotic, cars} would be a valid n-gram to generate.

With reference again to decision block 302, if the request type is a "content item request type," meaning that the request was triggered as a result of the user looking at and/or engaging with a particular content item, the routine 300 proceeds to block 308. At block 308, the text content for the request is generated from textual content from the metadata of the content item that the user is viewing or interacting with. As indicated above, this text content may include, by way of illustration and not limitation, a file name of the content item, a uniform resource locator (URL) from which the content item was obtained, a title of the associated content item, a page title in which the content item is posted, page comments of the page in which the content item is posted, and the like. These are aggregated, in a similar manner as described above regarding user interests, to the text content for the request.

With reference again to decision block 302, if the request type is a "search request type," meaning that it is a text-based query issued by the user, at block 310 the text content of the request is viewed as the text content for further processing.

After generating the text content for the request, at block 312 the terms of the text content are identified. Identification of the terms may result from parsing the text content and may further include correcting possible spelling errors of the resulting terms. Regarding the example above for the homepage request type, the terms of the text content would comprise three sets of terms: {exotic, sports, cars}, {home, gardening} and {astrology} from which n-grams are generated.

Figure 4:
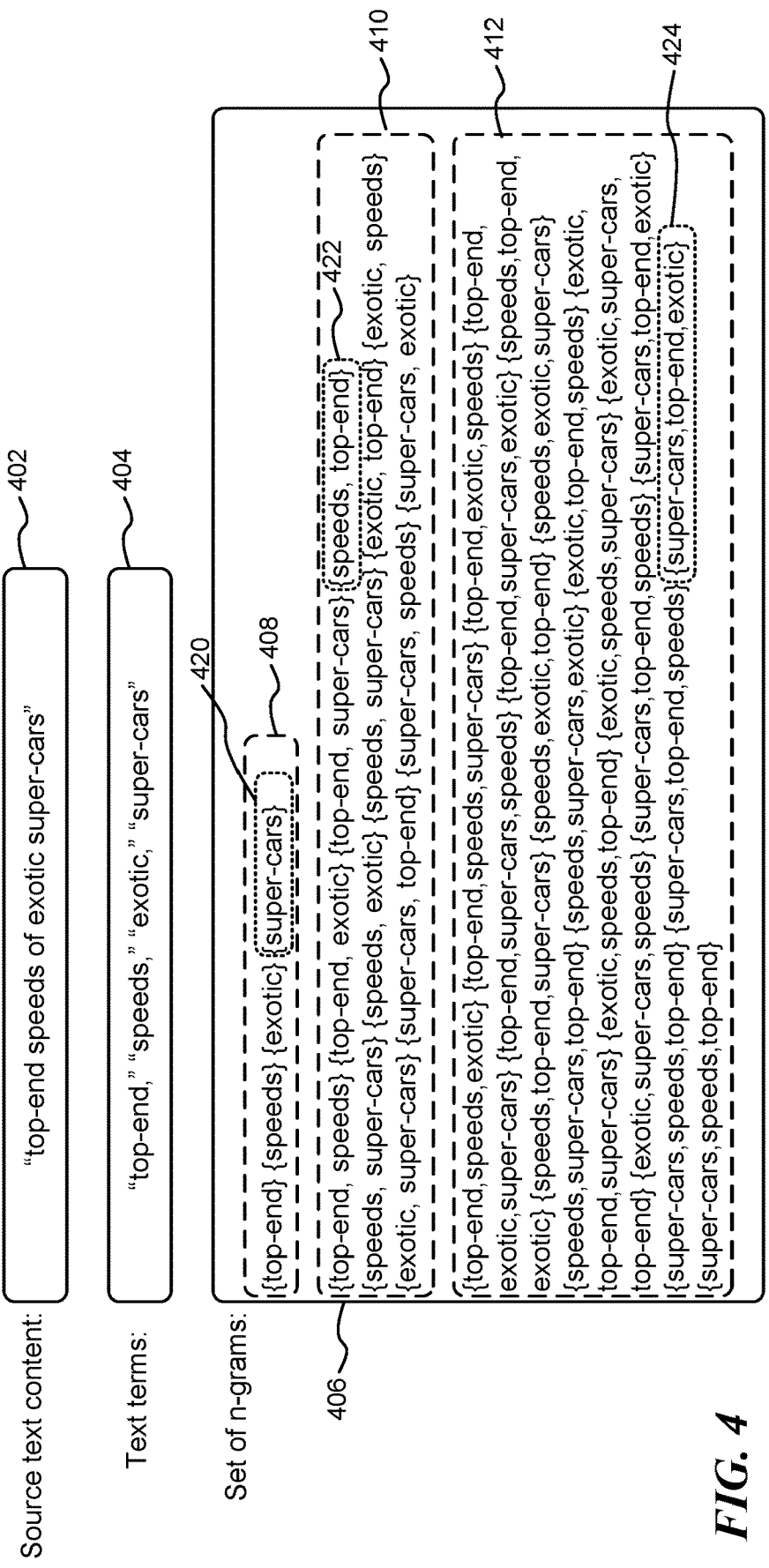
FIG. 4 is a block diagram illustrating the processing of text content into n-grams, in accordance with aspects of the disclosed subject matter.

To further illustrate generating a set of n-grams from text content, reference is made to FIG. 4. FIG. 4 is a block diagram illustrating the processing of text content into n-grams, in accordance with aspects of the disclosed subject matter. As indicated above, each n-gram comprises a set of one or more text terms of source text content, e.g., the text content of a request 120. However, as mentioned above, in the case of a homepage request, the source text content may comprise multiple phrases, and the n-gram generation is constrained to generate n-grams from terms within a single phrase, but not to generate n-grams for all phrases of the source text content. For purposes of generating n-grams in regard to FIG. 4, it is assumed that the request type is a search query and, at block 310, the source text content 402 of the search query is "top-end speeds of exotic super-cars."

In regard to block 312, a set of 404 text terms of the source text content 402 is identified, the text terms including "top-end," "speeds," "exotic," and "super-cars." According to aspects of the disclosed subject matter, in generating n-grams, each n-gram is unique (no duplicates) and the order of terms is considered important in determining uniqueness. For example, unique 2-word n-grams generated from the source text content 402 may include {top-end, speeds} and {speeds, top-end} since the order of the terms is important, i.e., a differentiating feature. Additionally, words/terms viewed as unimportant in generating n-grams, such as articles, conjunctions, etc., may be excluded when generating the n-grams. In the source text content 402, the word "of" is likely viewed as extraneous/unimportant and excluded from the generation of n-grams. In various embodiments, an exclusion list may be consulted to determine those words that are excluded from n-gram generation.

At block 314, the terms of the source text content 402 are then combined or permuted into n-grams, with each n-gram comprising one or more of the terms of the source text content, and each n-gram being unique from the other n-grams. According to aspects of the disclosed subject matter, a limit of the maximum number of terms that any given n-gram is imposed. In various embodiments, this limit is used to cap the number of permutations that can result from the source text content of a request (for processing purposes) and to manage the size of one or more indexes that may be generated to cache embedding vectors generated for the n-grams, which caching will be described in greater detail below. Thus, while the maximum number of terms generated for an n-gram may be set to any practical number, in various embodiments the maximum number of terms that may be included within an n-gram is set at four (4). With reference to the source text content 402 example above, and with a cap of terms in an n-gram set at four, and with order of terms being a differentiating feature, there would be 64 n-grams generated from the terms of the source text content: four (4) single-word n-grams, 12 two-word n-grams, 24 three-word n-grams, and 24 four-word n-grams. By way of example, source text content that includes 5 terms (all within the same phrase), where n-grams are capped at 4 terms, will result in the generation of 205 n-grams.

Turning again to FIG. 4, the source text content 402 (which is a single phrase) results in the illustrated set 404 of text terms. The text terms of set 404, when processed, result in the set 406 of n-grams. For illustration purposes, the set 406 of n-grams does not show the complete set of n-grams, omitting the 4-term n-grams. These n-grams include: n-gram set 408 that are single-word n-grams, such as n-gram 420; n-gram set 410 that are two-word n-grams, such as n-gram 422; and n-gram set 412 that are three-word n-grams, such as n-gram 424. For display purposes and for this illustrated example, the 4-term n-grams are not shown but include uniquely ordered arrangements of the four text terms of the set 404 of text terms.

At block 316, the set of n-grams is returned as the result of the routine 300, and the routine terminates.

With reference again to routine 200 of FIG. 2, at block 208, a content item embedding vector is determined for each of the n-grams of the request text content. According to various embodiments of the disclosed subject matter, these content item embedding vectors are generated by an embedding vector generator that is trained (i.e., a trained machine learning model) to generate an embedding vector for the text terms of an n-gram into a content item embedding space.

According to aspects of the disclosed subject matter, content item embedding vectors may be anticipatorily generated for a body of n-grams, cached and indexed for rapid retrieval. In various embodiments, performing indexed lookups for an embedding vector corresponding to common n-grams is likely substantially faster and computationally less than just-in-time generation of the embedding vectors. Thus, in various embodiments, the recommender service 130 maintains an indexed cache of n-grams with corresponding content item embedding vectors. Of course, when there are many users and many interests, it is likely that unique n-grams may be identified from the request text. Thus, a combination of indexed lookups and just-in-time embedding vector generation may be used in determining the content item embedding vectors for the n-grams of the search text content. Of course, the new n-gram/content item embedding vector pairs may be subsequently added to the cache and indexed for future use. Still further, just-in-time embedding vector generation, via a trained embedding vector generator, may be used in all instances when determining embedding vectors for the n-grams of the request's text content.

At block 210, the content item embedding vectors of the n-grams resulting from the request's text content are combined to form a representative embedding vector for the request. According to various embodiments of the disclosed subject matter, the combination of the embedding vectors may be done as an averaging of the values of the embedding vectors. According to additional aspects of the disclosed subject matter, weighting may be applied to embedding vectors for n-grams that are viewed as popular (frequency or lack of frequency of occurrence among request text content) or importance (i.e., importance or lack of importance of a particular n-gram to current events, etc.). These weightings may increase or decrease given an embedding vector's importance in the averaging or combining of the embedding vectors into the representative embedding vector.

With a representative embedding vector generated for the request, at block 212, a set of nearest neighbors is identified. This set of nearest neighbors, comprising a predetermined number k of content items in the corpus of content items, is identified according to the embedding vectors associated with the content items. In a logical sense, all of the content items are projected into the content item embedding space via their associated content item embedding vectors. The representative embedding vector is also projected into the content item embedding space and a set of the k nearest neighbors to the projection of the representative embedding vector are identified. Typically, though not exclusively, this "nearest" determination is made according to a cosine similarity evaluation between the representative embedding vector and the embedding vectors of the content items. In practice, when the number of content items in the corpus of content items is large, determining similarity distances, i.e., "nearness," between the representative embedding vector and the embedding vectors of the content items becomes computationally prohibitive. According to aspects of the disclosed subject matter, techniques for narrowing the number of content items that should be evaluated are used. One such technique is locality sensitive hashing that, through a hashing process, places the content items (via their embedding vectors) into buckets, as well as projecting the representative embedding vector into one or more of the buckets, and compares the similarities or distances between the content items in the buckets to the representative embedding vector, thereby significantly reducing the number of comparisons/evaluations to be made.

In accordance with still further aspects of the disclosed subject matter, the set of k nearest neighbor content items is filtered such that content items with which the user has recently (or even once) interacted with are excluded from the set of k nearest neighbors.

After identifying the set of k nearest neighbor content items, at block 214 a subset of n nearest neighbor content items is selected as recommended content to the request. This subset of n nearest neighbor content items may be based entirely on the distance evaluations such that the closest neighboring contenting items to the representative embedding vector (as projected in the content item embedding space) are returned. In an alternative embodiment, randomization may also be included in the selection of the subset of n nearest neighbor content items so that "fresh" content items, i.e., not commonly presented for the combination of n-grams, may also be included in the recommended content to the requesting user.

At block 216, the subset of n nearest neighbor content items are returned as recommended content for the received request from the user. According to embodiments of the disclosed subject matter, while the routine 200 suggests returning the n nearest neighbor content items, identifiers unique to each nearest neighbor content item are returned and the actual content items are retrieved at the time they are presented to the user. After returning the subset of n nearest neighbor content items (or their identifiers), routine 200 terminates.

Figure 5:
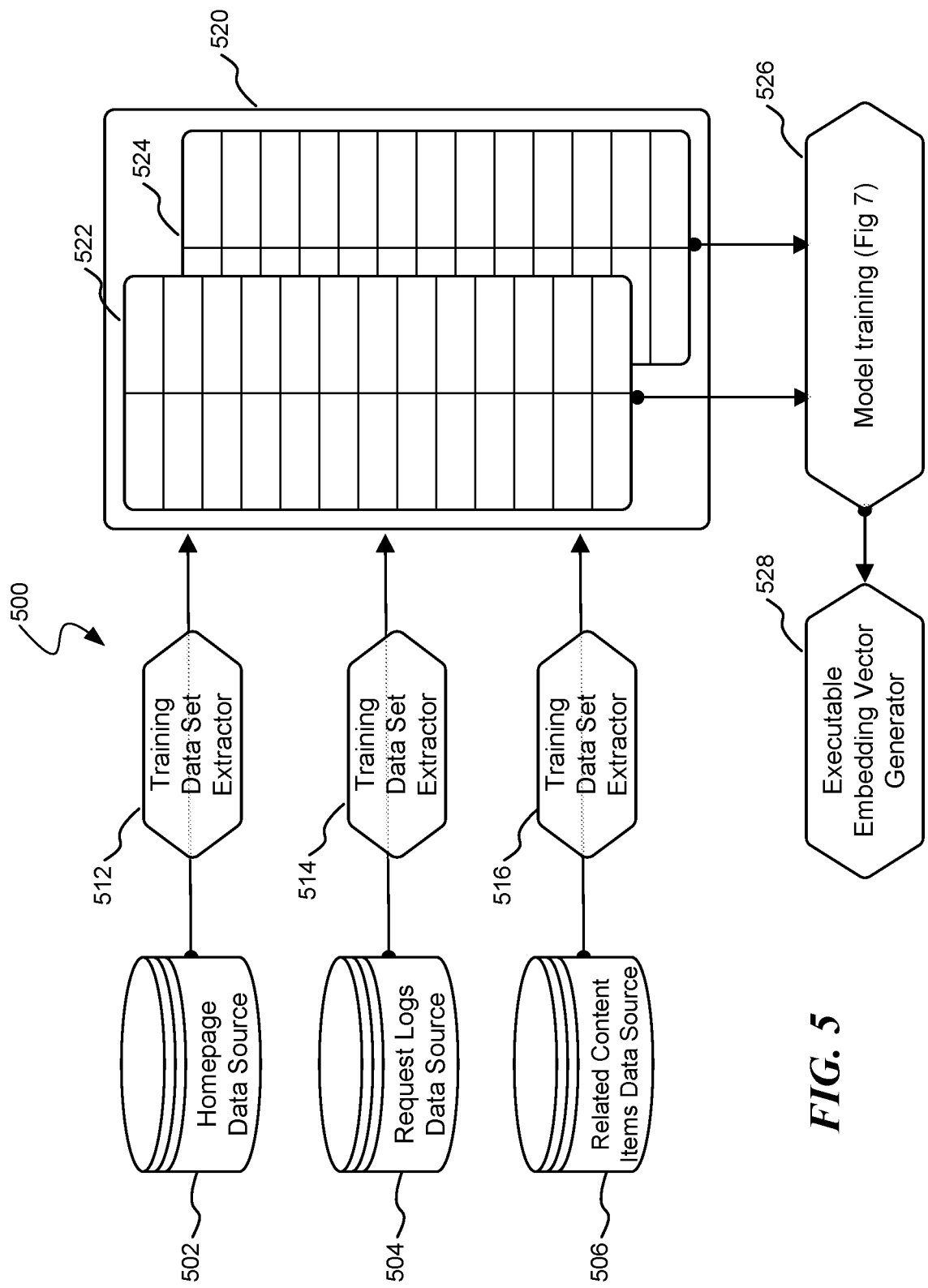
FIG. 5 is a pictorial diagram illustrating an exemplary process of training a machine learning model as an embedding vector generator, trained to generate embedding vectors for text content, in accordance with aspects of the disclosed subject matter.

Regarding the training of a machine learning model to generate content item embedding vectors for n-grams, reference is now made to FIG. 5. FIG. 5 is a pictorial diagram illustrating an exemplary flow or process 500 of training a machine learning model as an embedding vector generator, trained to generate content item embedding vectors for the text content of an n-gram, in accordance with aspects of the disclosed subject matter.

As shown in process 500, multiple task-related data sources, including homepage data source 502, request logs data source 504, and related content items data source 506, are processed to generate a set of training data 520. According to aspects of the disclosed subject matter, utilizing data from multiple task-related data sources improves the accuracy of the overall training of the embedding vector generator.

As shown in process 500, each task-related data source is processed by a training data set extraction process particularly tailored to the input data source. Thus, homepage data source 502 is processed by a homepage training data set extractor 512 to generate at least a portion of the training data 520 used to train a machine learning model to generate content item embedding vectors for the text content of n-grams. Similarly, the request logs data source 504 is processed by a request log training data set extractor 514 to generate its portion of the training data 520, and the related content items data source 506 is processed by a related content item training data set extractor 516 to generate its portion of the training data.

According to aspects of the disclosed subject matter, each training data set extractor identifies discrete actions of the data source in which a content item is related, extracts text content from the discrete actions, generates a set of n-grams for the discrete actions, and generates n-gram/content item pairs. These n-gram/content item pairs are viewed as positive training data and included in the portion of positive training data 522 of the training data 520. In addition to generating the positive training pairs, negative training pairs may also be generated through a variety of means, including replacing the content item of the discrete action with a randomly selected content item from the corpus of content items as part of an n-gram/content item pair. The negative training data is included among the negative training data 524 of the training data 520.

After extracting the training data 520 from a plurality of task-related data sources, the training data is passed to a model training process 526 to train the machine learning model to generate content item embedding vectors for the text content of an n-gram. A general description of training a machine learning model is set forth below regarding routine 700 of FIG. 7. As shown in FIG. 5, the result of training the machine learning model is an executable embedding vector generator 528 to generate content item embedding vectors for n-grams.

Figure 6:
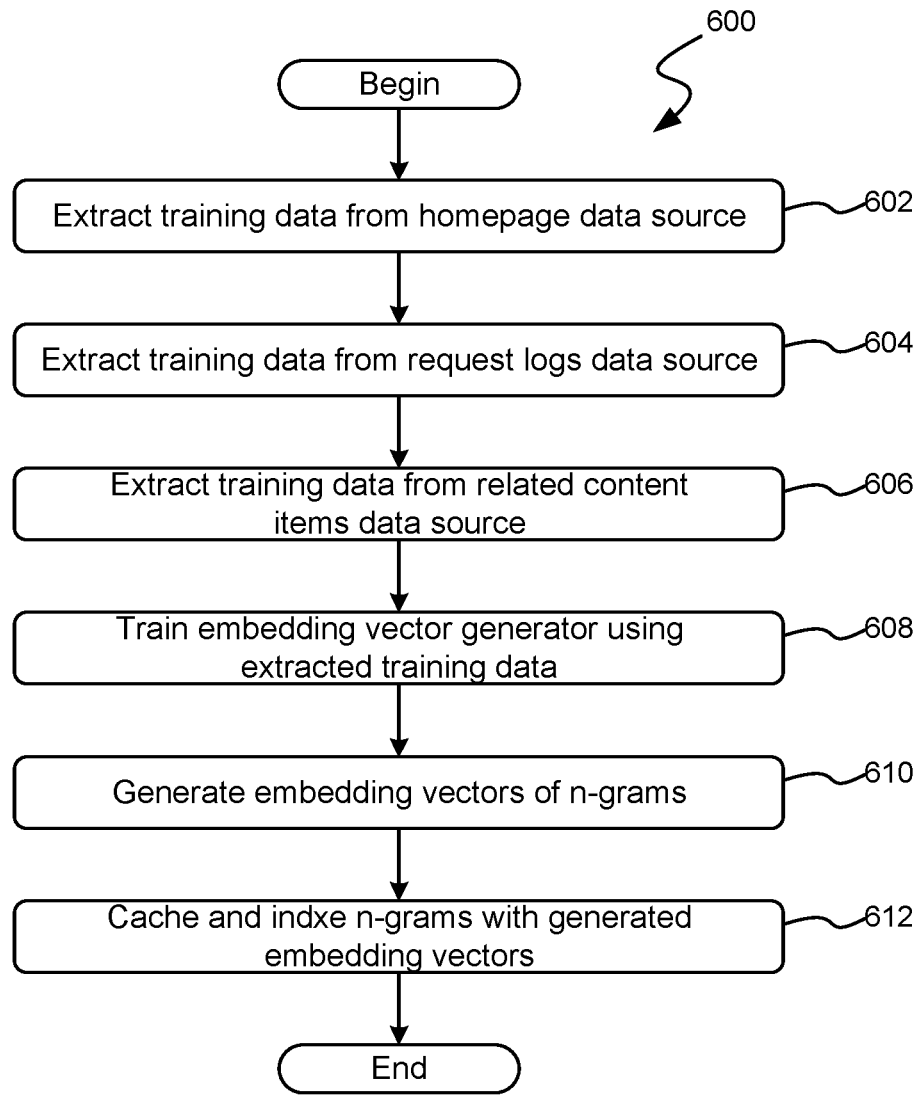
FIG. 6 is a flow diagram illustrating an exemplary routine for extracting training data from multiple task-related data sources, and training a machine learning model as an embedding vector generator with the training data to generate embedding vectors for a text-based n-gram into a content item embedding space, in accordance with aspects of the disclosed subject matter.

Regarding the process of training the machine learning model, FIG. 6 is a flow diagram illustrating an exemplary routine 600 for extracting training data from multiple task-related data sources 502, 504 and 506, and model training process 526 for training a machine learning model as an executable embedding vector generator 528 with the training data 520 to generate embedding vectors for a text-based n-gram into a content item embedding space, in accordance with aspects of the disclosed subject matter.

Beginning at block 602, training data from a homepage data source 502 is extracted. At block 604, training data from a request logs data source 504 is extracted. Similarly, at block 606, training data from a related content items data source 506 is extracted. As indicated above, the training data 520 includes both positive training data 522 and negative training data 524.

At block 608, a machine learning model is trained as an embedding vector generator for generating n-grams to content item embedding vectors in a content item embedding space. At block 610, in order to cache and index n-gram/content item pairs, content item embedding vectors are generated for the training pairs of the positive training data 522. At block 612, the training pairs are cached and indexed. Thereafter, the routine 600 terminates.

Figure 7:
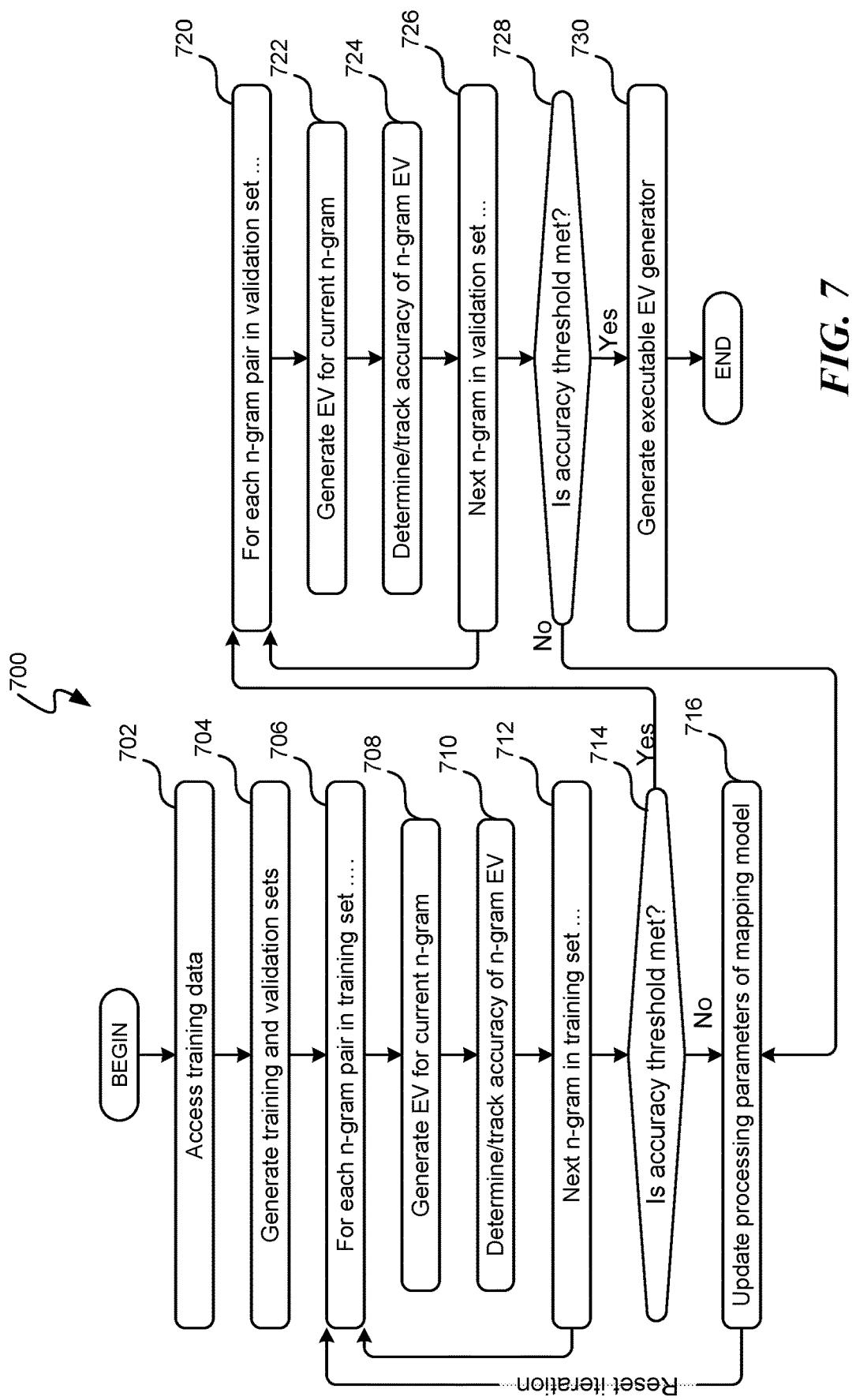
FIG. 7 is a flow diagram illustrating an exemplary, generalized routine for training a machine learning model, according to training data of n-gram/content item training pairs, to generate content item embedding vectors for the text terms of an n-gram, in accordance with aspects of the disclosed subject matter.

Regarding training a machine learning model to generate content item embedding vectors for the text terms of an n-gram, reference is now made to FIG. 7. Indeed, FIG. 7 is a flow diagram illustrating an exemplary, generalized routine 700 for training a machine learning model, according to training data 520 of n-gram/content item training pairs, to generate content item embedding vectors for the text terms of an n-gram, in accordance with aspects of the disclosed subject matter.

Beginning to block 702, training data 520 comprising n-gram/content item pairs is accessed. As indicated above, the training data includes both positive training data 522 and negative training data 524. According to aspects of the disclosed subject matter, the training data comprises training pairs from a plurality of task-related data sources. Indeed, in various embodiments of the disclosed subject matter, the training data 520 comprises training pairs from at least a homepage data source 502, a request logs data source 504, and a related content items data source 506, as shown in FIG. 5.

At block 704, training and validation sets are generated from the training data 520. These training and validation sets comprise training pairs randomly selected from the training data. In this manner, each of the sets include positive training pairs, i.e., training pairs in which the n-grams are related to the content item (and, therefore, the embedding vector of the content item of the training pair), and negative training pairs, i.e., training pairs in which the n-grams are not related to the content item.

As those skilled in the art will appreciate, the purpose of both training and validation sets is to carry out training iterations of a machine learning model (in this instance, an embedding vector generator) by repeatedly training the machine learning model and subsequently validating the training of the machine learning model until the machine learning model achieves a predetermined threshold of accuracy. Typically, though not exclusively, the training and validation sets include about the same number of training pairs. Additionally, a sufficient number of training pairs must be contained within each set to ensure proper training and validation, since using too few may result in a high level of accuracy among the training and validation sets, but a low level of accuracy in practice.

With the training and validation sets established, at block 706, an iteration loop is begun to iterate through the training pairs of the training set. At block 708, a content item embedding vector is generated by the machine learning model for the text term(s) of the currently iterated n-gram. At block 710, the accuracy of the in-training machine learning model is determined and tracked. For example, the content item embedding vector generated for the n-gram of the currently iterated training pair may be compared for similarity or proximity in the content item embedding space to the embedding vector of the content item of the currently iterated training pair. Depending on the distance between the two embedding vectors, as may be determined according to a cosine similarity analysis, and on whether this is a positive training pair or a negative training pair, the accuracy of the in-training machine learning model can be tracked, particularly in aggregation with the results of other iterations.

After determining and tracking the accuracy of the training model on the currently iterated training pair, at block 712 if there are additional training pairs in the training set to be processed, the routine 700 returns to block 706 to select and process the next training pair, as set forth above. Alternatively, if there are no additional training pairs in the training set to be processed, the routine 700 proceeds to decision block 714.

At decision block 714, a determination is made as to whether a predetermined accuracy threshold is met by the in-training machine learning model in processing the training pairs of the training set. This determination is made according to the tracking information through processing the training data. If the in-training machine learning model has not at least achieved this predetermined accuracy threshold, the routine 700 proceeds to block 716.

At block 716, the processing parameters that affect the various processing layers of the in-training machine learning model, including but not limited to the convolutions, aggregations, formulations, and/or hyperparameters of the various layers, are updated, and the routine 700 returns to block 706, thereby resetting the iteration process on the training data in order to iteratively continue the training of the in-training machine learning model.

With reference again to decision block 714, if the predetermined accuracy threshold has been met by the in-training machine learning model, routine 700 proceeds to block 720. At block 720, an iteration loop is begun to process the training pairs of the validation set, much like the processing of the training pairs of the training set. Indeed, at block 722, a content item embedding vector is generated by the machine learning model for the text term(s) of the currently iterated n-gram. At block 724, the accuracy of the in-training machine learning model is determined and tracked. More particularly, the distance between the two embedding vectors, as may be determined according to a cosine similarity analysis, and whether this is a positive training pair or a negative training pair, is used to determine the accuracy of the in-training machine learning model. This accuracy determination is tracked such that in aggregation with the determined accuracy from the other training pairs, the overall accuracy of the in-training machine learning model can be determined.

At block 726, if there are additional training pairs in the validation set to be processed, the routine 700 returns to block 720 to select and process the next training pair of the validation set, as described forth above. Alternatively, if there are not additional training pairs to be processed, the routine 700 proceeds to decision block 728.

At decision block 728, a determination is made as to whether a predetermined accuracy threshold, which may or may not be the same predetermined accuracy threshold as used in block 714, is met by the machine learning model in processing the validation set. This determination is made according to the tracking information aggregated in processing the training pairs of the validation set. If the in-training machine learning model has not at least achieved this predetermined accuracy threshold, then routine 700 proceeds to block 716. As set forth above, at block 716, the processing parameters of the in-training machine learning model, including but not limited to the convolutions, aggregations, formulations, and/or hyperparameters, are updated and the routine 700 returns to block 706, resetting the iteration process in order to restart the iterations with the training pairs of the training set.

In the alternative, at decision block 728, if the accuracy threshold has been met (or exceeded), it is considered that the machine learning model has been accurately trained and the routine 700 proceeds to block 730. At block 730, an executable embedding vector generator is generated from the now-trained machine learning model. As those skilled in the art will appreciate, the in-training version of the machine learning model will include elements that allow its various levels, processing variables and/or hyperparameters to be updated. In contrast, an executable embedding vector generator is generated such that those features that allow the in-training machine learning model to be updated and "trained" are removed without modifying the trained, functionality of the now-trained machine learning model. Thereafter, the routine 700 terminates.

Figure 8:
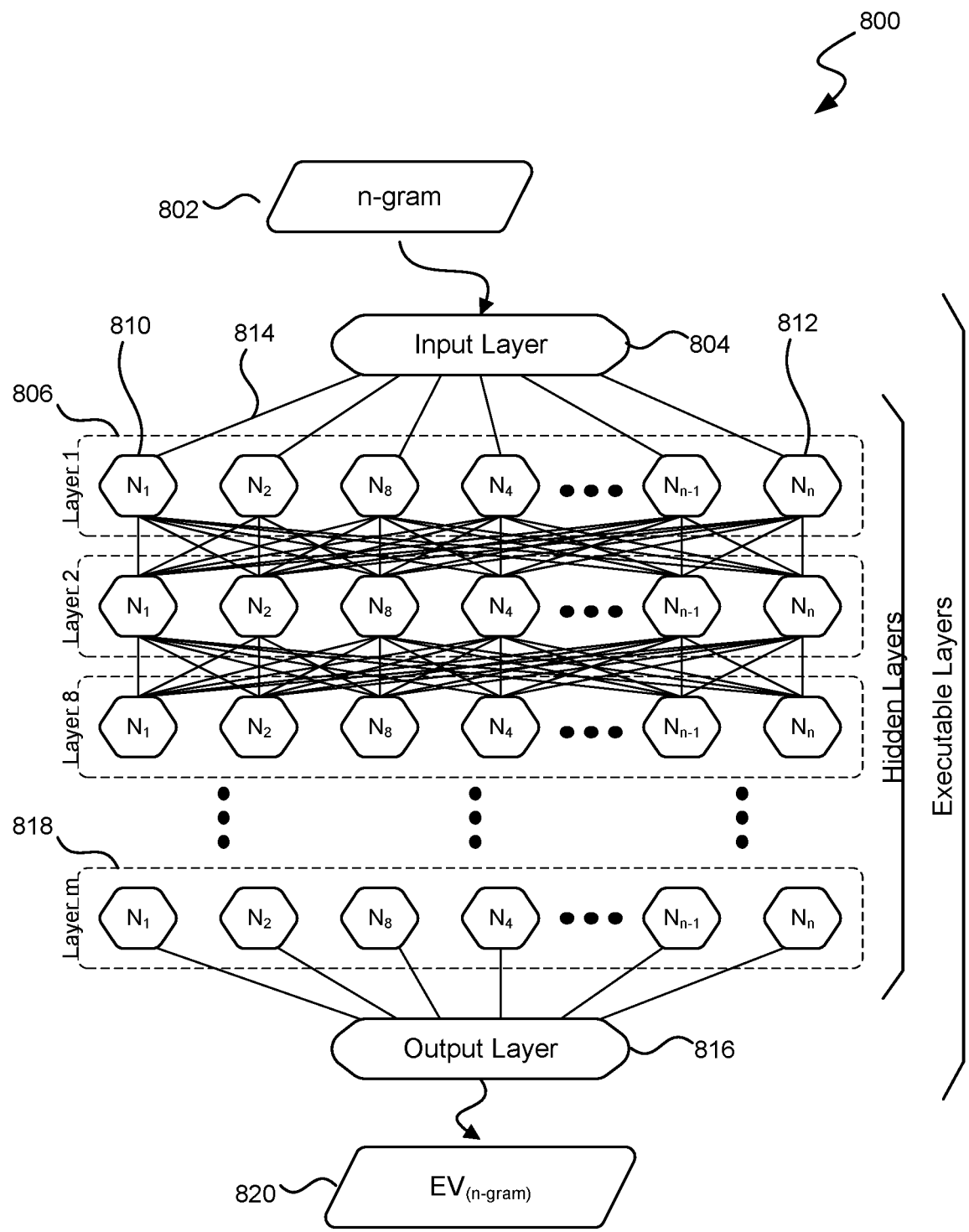
FIG. 8 is a block diagram illustrating exemplary components of a machine learning model which can be suitably trained as an embedding vector generator to generate embedding vectors of text content into a content item embedding space, in accordance with aspects of the disclosed subject matter.

Reference was made in routine 700 to the various layers and elements of a machine learning model. To that end, FIG. 8 is a block diagram illustrating exemplary components of a machine learning model 800, also called a deep neural network, which can be suitably trained as an embedding vector generator to generate embedding vectors of text content into a content item embedding space, in accordance with aspects of the disclosed subject matter.

As those skilled in the art will appreciate, a machine learning model 800 comprises multiple executable layers, including an input layer 804, an output layer 816, and one or more hidden layers. By way of illustration, the exemplary machine learning model 800 includes m hidden layers, including hidden layers 806 and 818. The input layer 804 accepts the input data, e.g., an n-gram 802 that contains one or more text terms, for which the machine learning model 800 is to generate an embedding vector into a content item embedding space.

The input layer 804 accepts the input data, in this illustrated instance an n-gram 802 containing one or more text terms, and, according to one or more predetermined algorithms and/or heuristics embedded within the various layers, maps the input embedding vector into the partial multi-item embedding vector through a series of process layers, each layer outputting values. These values, not shown in FIG. 8 but implied by the various edges, such as edge 814, extending from the input layer 804 to the various processing nodes of the first hidden layer 806, constitute at least some of the output of the input layer and are distributed as input data or input values to processing nodes of the first hidden layer 806 of the machine learning model 800, such as processing nodes 810 and 812.

Typically, though not exclusively, the one or more values or facets of the input data (i.e., text terms of the n-gram) passed from the input layer 804 to a first processing node in the first hidden layer, such as processing node 810 of hidden layer 806, is different than a value/facet passed to a second processing node of that same hidden layer, such as to processing node 812 of hidden layer 806.

Each hidden layer, including hidden layers 806 and 818, comprises a plurality of processing or convolutional nodes. By way of illustration and not limitation, hidden layer 806 includes n processing nodes, $N_1$-$N_n$. While the processing nodes of the first hidden layer 806 typically, though not exclusively, have a single input value from the input layer 804, processing nodes of subsequent hidden layers typically have input values from one or more processing nodes of the previous input layer. Of course, in various embodiments, the processing nodes of the first hidden layer 806 may receive, as input values, all output values of the input layer 804.

In various embodiments and as illustrated in the executable machine learning model 800, each hidden layer (except for the first hidden layer 806) accepts input data/signals from each processing node of the prior hidden layer, as indicated by the edges proceeding from a processing node of an "upper" hidden layer (e.g., layer 806) to a "lower" hidden layer. Of course, alternative embodiments need not include such wide distribution of output values to the processing nodes of a subsequent, lower level.

Each processing node implements one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolutions and computations. Hyperparameters (data/values that are input from sources external to processing nodes of a prior input level) may also be utilized by all or some of the processing nodes of a hidden layer.

As will be appreciated by those skilled in the art, one of the interesting aspects of training machine learning models is that the various executable levels are adaptable to accommodate self-learning. In other words, when provided feedback, modifications are made to the weights, parameters, and processing or convolutional operations of the processing nodes in the various layers, in order to achieve better results. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning model, the machine learning model adaptively makes its own determinations as to how to modify each computation, convolution or transformation of a given processing node to produce better and/or superior results from the input values it receives.

At the final hidden layer, e.g., layer 818, the processing nodes provide their output data to the output layer 816. The output layer 816 performs whatever final aggregations, calculations, transformations, projections, normalizations and/or interpretations of the various items of input data to produce a content item embedding vector 820 based on the input n-gram 802.

Regarding routines 200, 300, 600 and 700 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computer system described in FIG. 10 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer readable storage media, which (for purposes of this disclosure) are articles of manufacture. As those skilled in the art will recognize, computer readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer-readable media expressly excludes carrier waves and/or propagated signals.

Figure 9:
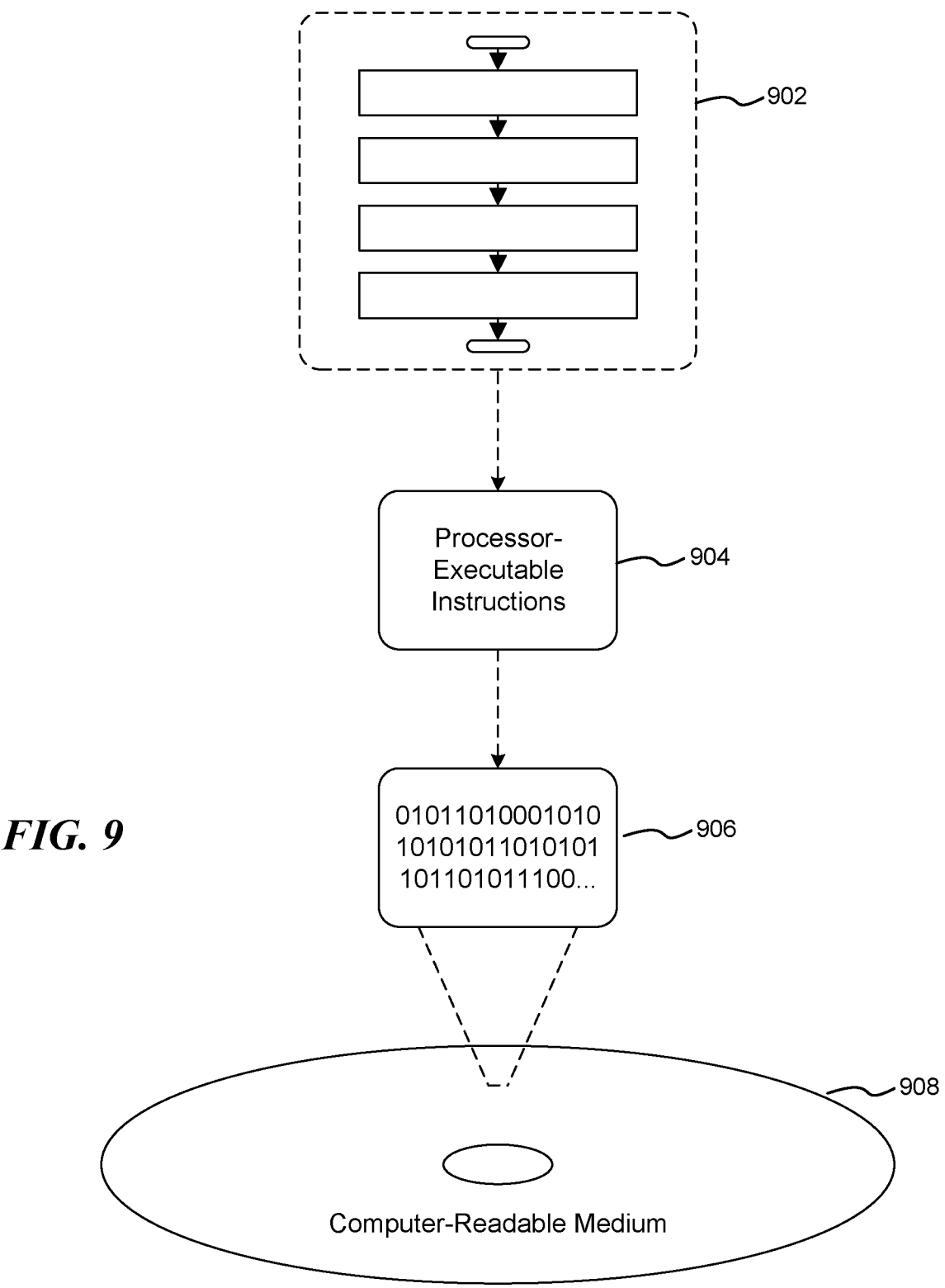
FIG. 9 is a block diagram illustrating an exemplary computer-readable medium encoded with instructions for responding to a user's request for recommended content, formed in accordance with aspects of the disclosed subject matter.

Regarding computer-readable media, FIG. 9 is a block diagram illustrating an exemplary computer-readable medium 908 encoded with instructions for responding to a user's request for recommended content, formed in accordance with aspects of the disclosed subject matter. More particularly, the illustrated implementation comprises a computer-readable medium 908 (e.g., a CD-R, DVD-R or a platter of a hard disk drive), on which is encoded computer-readable data 906. This computer-readable data 906 in turn comprises a set of processor-executable instructions 904 configured to operate according to one or more of the principles set forth herein. In one such embodiment 902, the processor-executable instructions 904 may be configured to perform a method, such as at least some of exemplary routines 200, 300, 600 and 700, for example. In another such embodiment, the processor-executable instructions 904 may be configured to implement a system on a computing system or device, such as at least some of the exemplary, executable components of computer system 1000 of FIG. 10, as described below. Many such computer-readable media may be devised, by those of ordinary skill in the art, which are configured to operate in accordance with the techniques presented herein.

Figure 10:
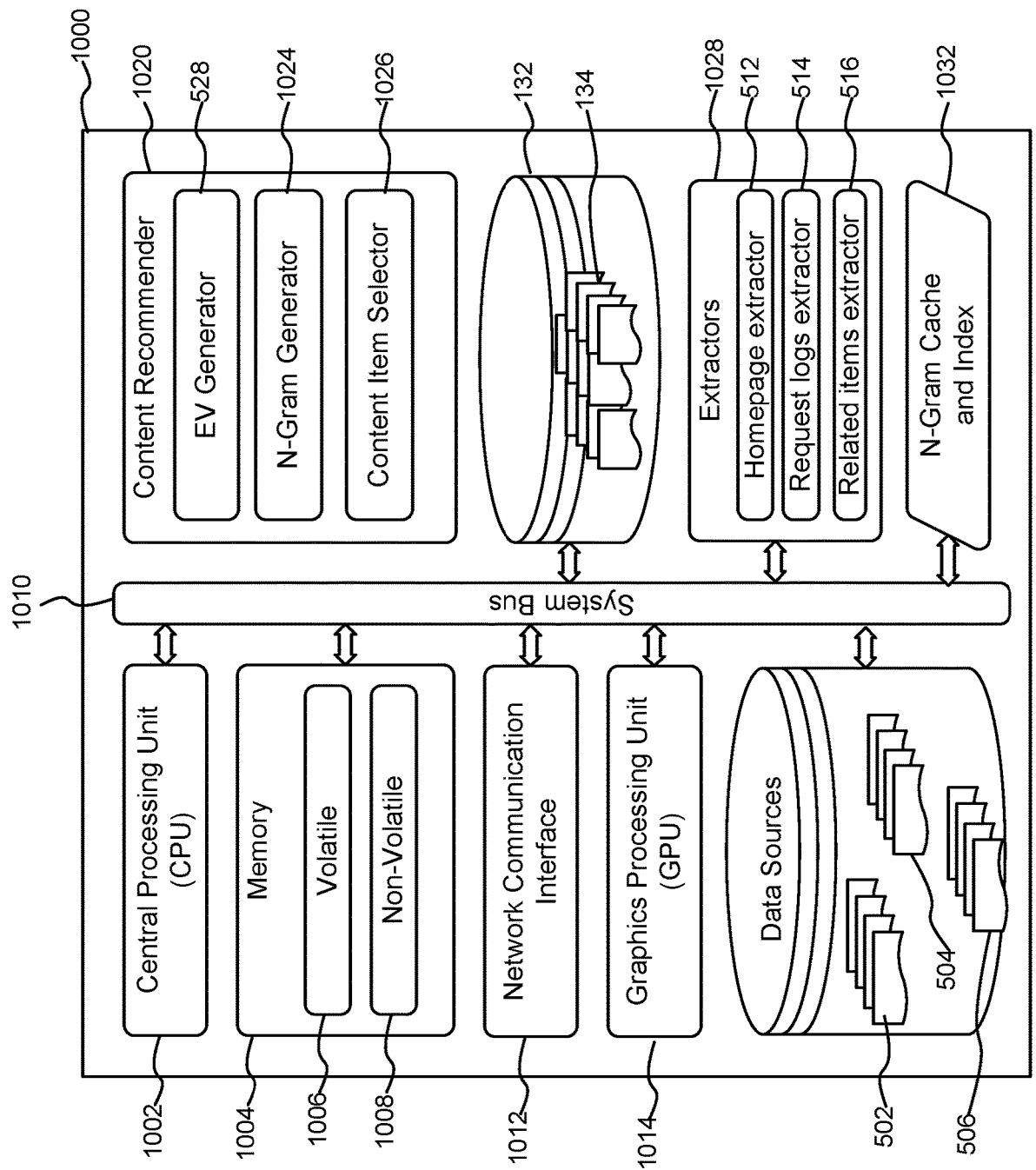
FIG. 10 is a block diagram of a computing system suitably configured to implement aspects of a recommender service, including responding to a user's request for recommended content, in accordance with aspects of the disclosed subject matter.

Turning to FIG. 10, FIG. 10 is a block diagram of a computer system suitably configured to implement aspects of a recommender service, including responding to a user's request for recommended content, in accordance with aspects of the disclosed subject matter. The computer system 1000 typically includes one or more central processing units (or CPUs), such as CPU 1002, and further includes at least one memory 1004. The CPU 1002 and memory 1004, as well as other components of the computing system, are typically interconnected by way of a system bus 1010.

As will be appreciated by those skilled in the art, the memory 1004 typically (but not always) comprises both volatile memory 1006 and non-volatile memory 1008. Volatile memory 1006 retains or stores information so long as the memory is supplied with power. In contrast, non-volatile memory 1008 can store (or persist) information even when a power supply is not available. In general, RAM and CPU cache memory are examples of volatile memory 1006 whereas ROM, solid-state memory devices, memory storage devices, and/or memory cards are examples of non-volatile memory 1008.

As will be further appreciated by those skilled in the art, the CPU 1002 executes instructions retrieved from the memory 1004 from computer-readable media, such as computer-readable medium 908 of FIG. 9, and/or other executable components, in carrying out the various functions of the disclosed subject matter. The CPU 1002 may be comprised of any of several available processors, such as single-processor, multi-processor, single-core units, and multi-core units, which are well known in the art.

Further still, the illustrated computer system 1000 typically also includes a network communication interface 1012 for interconnecting this computing system with other devices, computers and/or services over a computer network, such as network 108 of FIG. 1. The network communication interface 1012, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication interface 1012, is typically comprised of hardware and/or firmware components (and may also include or comprise executable software components) that transmit and receive digital and/or analog signals over a transmission medium (i.e., the network 108).

The illustrated computer system 1000 also frequently, though not exclusively, includes a graphics processing unit (GPU) 1014. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data, including the generation of embedding vectors of text terms of an n-gram. One or more GPUs, such as GPU 1014, are often viewed as essential processing components of a computing system when conducting machine learning techniques. Also, and according to various embodiments, while GPUs are often included in computing systems and available for processing or implementing machine learning models, multiple GPUs are also often deployed as online GPU services or farms and machine learning processing farms.

Also included in the illustrated computer system 1000 is a content recommender 1020. As operationally described above in regard to routine 200 of FIG. 2, the content recommender 1020 is a logical, executable component of the computer system 1000 that, in execution, is configured to receive a request 120 for recommended content for a user, obtain n-grams from the request, generate a representative embedding vector for the request, identify a set of nearest content items according to a distance measure to the representative embedding vector, and return at least some of the nearest content items as recommended content in a response 122 to the user.

In identifying recommended content items for a user, the content recommender 1020 utilizes a trained executable embedding vector generator 528 that generates a content item embedding vector for text terms of a set of n-grams. To obtain the set of n-grams, the content recommender 1020 utilizes an n-gram generator 1024. In operation and as outlined in routine 300 of FIG. 3, using the received request 120, the n-gram generator 1024 identifies the type of request from the user, obtains textual content for the request according to its determined type, identifies the terms of the textual content and generates a set of n-grams, each n-gram being unique to the others and including at least one term of the textual content.

In furtherance of identifying recommended content items for a user, the content recommender 1020 utilizes a content item selector 1026 that selects a set of content items that are the nearest neighbors to the request, as determined by a distance measurement between the representative embedding vector for the request and embedding vectors associated with content items of the corpus of content items 134, as stored and maintained in a data store 132. According to various aspects of the disclosed subject matter, a locality sensitive hashing (LSH) function is applied to narrow down the number of content items (or, more particularly, the embedding vectors of the content items) from the entire corpus to a small section thereof.

As discussed above regarding FIGS. 5, 6 and 7, the executable embedding vector generator 528, being a trained machine learning model, relies upon a plurality of type-related data sources to generate training data 520 used in training the embedding vector generator. These data sources include a homepage data source 502, a request logs data source 504, and a related content items data source 506. Training pairs are extracted from these various data sources by a set of corresponding training data set extractors 1028, including a homepage training data set extractor 512, a request logs training data set extractor 514, and a related content item training data set extractor 516. As also discussed regarding FIGS. 5, 6 and 7, the positive training data pairs may be used to generate an n-gram cache and index 1032 for efficient processing of requests.

Regarding the various components of the exemplary computer system 1000, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)," the meaning should be interpreted as indicating the singular or the plural form of the word or term, depending on whether there is one instance of the term/item or whether there is one or multiple instances of the term/item. For example, the term "subscriber(s)" should be interpreted as one or more subscribers. Moreover, the use of the combination "and/or" with multiple items should be viewed as meaning either or both items.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, comprising:
   determining, based at least in part on a request type associated with a request, textual content associated with the request, wherein the textual content includes a plurality of text terms;
   generating, based at least in part on the textual content, a plurality of n-grams, wherein each of the plurality of n-grams is a unique permutation of one or more of the plurality of text terms;
   for each n-gram of the plurality of n-grams, obtaining an embedding vector that projects the n-gram into a content item embedding space;
   generating, based at least in part on the embedding vectors associated with each n-gram of the plurality of n-grams, a representative embedding vector that is representative of the request;
   determining, based at least in part on the representative embedding vector, at least one recommended content item from a corpus of content items; and
   providing the at least one recommended content item in response to the request.

2. The computer-implemented method of claim 1, wherein:
   the request type is a homepage request type; and
   determining the textual content associated with the request includes determining an interest of a user associated with the request based at least in part on at least one of a user profile associated with the user or a homepage associated with the user.

3. The computer-implemented method of claim 2, wherein the interest includes a plurality of interests, and the plurality of n-grams is generated from one of the plurality of interests.

4. The computer-implemented method of claim 1, wherein:
   the request type is a content item request type; and
   determining the textual content associated with the request includes determining metadata associated with a triggering content item.

5. The computer-implemented method of claim 4, wherein the metadata includes at least one of:
   a uniform resource locator (URL) associated with the triggering content item;
   a title of the triggering content item;
   a page title associated with a page on which the triggering content item is posted; or
   a page comment associated with the page on which the triggering content item is posted.

6. A computing system, comprising:
   one or more processors; and
   a memory storing program instructions that, when executed by the one or more processors, cause the one or more processors to at least:
   determine, based at least in part on a request type associated with a request, textual content associated with the request;
   generate, based at least in part on the textual content, a plurality of n-grams;
   for each n-gram of the plurality of n-grams, obtain an embedding vector that projects the n-gram into a content item embedding space;
   generate, based at least in part on the embedding vectors associated with each n-gram of the plurality of n-grams, a representative embedding vector;
   determine, based at least in part on the representative embedding vector, a plurality of recommended content items from a corpus of content items; and
   provide at least one of the plurality of recommended content items as responsive to the request.

7. The computing system of claim 6, wherein:
   the textual content associated with the request includes a plurality of text terms; and
   each of the plurality of n-grams is a unique permutation of one or more of the plurality of text terms.

8. The computing system of claim 6, wherein the at least one of the plurality of recommended content items is randomly selected from the plurality of recommended content items.

9. The computing system of claim 6, wherein the plurality of recommended content items is determined based at least in part on a cosine similarity between the representative embedding vector and a plurality of content item embedding vectors associated with the corpus of content items.

10. The computing system of claim 6, wherein the plurality of recommended content items is determined using a locality sensitive hashing (LSH) technique.

11. The computing system of claim 6, wherein the representative embedding vector is generated based at least in part on a weighted average of the embedding vectors associated with each of the plurality of n-grams.

12. The computing system of claim 6, wherein at least one of the embedding vectors associated with each of the plurality of n-grams is obtained from an indexed cache of embedding vectors associated with a plurality of stored n-grams.

13. The computing system of claim 6, wherein at least one of the embedding vectors associated with each of the plurality of n-grams is obtained from a just-in-time embedding vector generator.

14. The computing system of claim 6, wherein the request type includes at least one of:
   a homepage request type;
   a content item request type; or
   a text query request type.

15. The computing system of claim 14, wherein:
   the request type is the homepage request type; and
   determining the textual content associated with the request includes determining an interest of a user associated with the request based at least in part on at least one of a user profile associated with the user or a homepage associated with the user.

16. The computing system of claim 14, wherein:
   the request type is the content item request type; and
   determining the textual content associated with the request includes determining metadata associated with a triggering content item.

17. A computer-implemented method, comprising:
   determining textual content associated with a request, the textual content including a plurality of text terms;
   generating, based at least in part on the textual content, a plurality of n-grams, each of the plurality of n-grams being a unique permutation of one or more of the plurality of text terms;
   for each n-gram of the plurality of n-grams, obtaining an embedding vector that projects the n-gram into a content item embedding space;
   generating, based at least in part on the embedding vectors associated with each n-gram of the plurality of n-grams, a representative embedding vector representative of the request;

determining, based at least in part on the representative embedding vector, at least one recommended content item from a corpus of content items; and providing the at least one recommended content item in response to the request.

18. The computer-implemented method of claim 17, further comprising:

determining a request type associated with the request, and wherein the textual content is generated based at least in part on the request type.

19. The computer-implemented method of claim 17, wherein the at least one recommended content item is randomly selected from a plurality of recommended content items.

20. The computer-implemented method of claim 17, wherein at least one of the embedding vectors associated with each of the plurality of n-grams is obtained from an indexed cache of embedding vectors associated with a plurality of stored n-grams.

* * * * *